United States Patent
Li et al.

(10) Patent No.: US 12,254,800 B2
(45) Date of Patent: Mar. 18, 2025

(54) MULTI-LAYER DISPLAY MODULE

(71) Applicant: PlayNitride Display Co., Ltd., MiaoLi County (TW)

(72) Inventors: Yun-Li Li, MiaoLi County (TW); Kuan-Yung Liao, MiaoLi County (TW); Sheng-Yuan Sun, MiaoLi County (TW); Yi-Ching Chen, MiaoLi County (TW); Zong Huei Tsai, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 0 days.

(21) Appl. No.: 18/389,782

(22) Filed: Dec. 20, 2023

(65) Prior Publication Data
US 2024/0346969 A1    Oct. 17, 2024

Related U.S. Application Data

(60) Provisional application No. 63/459,252, filed on Apr. 13, 2023.

(51) Int. Cl.
G09G 3/00    (2006.01)
G06F 3/01    (2006.01)
G09G 3/32    (2016.01)

(52) U.S. Cl.
CPC .............. *G09G 3/007* (2013.01); *G06F 3/013* (2013.01); *G09G 3/32* (2013.01);
(Continued)

(58) Field of Classification Search
CPC .... G09G 3/007; G09G 3/32; G09G 2300/023; G09G 2320/028; G09G 2340/0407; G09G 2340/10; G09G 2356/00; G09G 2360/16
See application file for complete search history.

(56) References Cited

U.S. PATENT DOCUMENTS

| | | |
|---|---|---|
| 10,237,538 B2 | 3/2019 | Wang et al. |
| 11,398,461 B2 | 7/2022 | Shin et al. |

(Continued)

FOREIGN PATENT DOCUMENTS

| | | |
|---|---|---|
| CN | 108107623 | 6/2018 |
| CN | 110018573 | 7/2019 |

(Continued)

OTHER PUBLICATIONS

TW112149776 Machine translated office action. (Year: 2024).*
(Continued)

*Primary Examiner* — Patrick N Edouard
*Assistant Examiner* — Joseph P Fox
(74) *Attorney, Agent, or Firm* — JCIPRNET

(57) ABSTRACT

A multi-layer display module includes a first display panel, and a second display panel. Dimension of long side of the first display panel is D1, and the first display panel has first pixel resolution P1. The second display panel is located on one side of the first display panel and overlapped with the first display panel. There is a space d between the first display panel and the second display panel. Dimension of the long side of the second display panel is D2, and the second display panel has the second pixel resolution P2. Transmittance of the second display panel is T2. The multi-layer display module complies with T2>40%, P1≠P2, and $$D2*T2 \geq d \geq \frac{D2}{|P1-P2|*P2}.$$

13 Claims, 10 Drawing Sheets

(52) U.S. Cl.
CPC . *G09G 2300/023* (2013.01); *G09G 2320/028* (2013.01); *G09G 2320/0626* (2013.01); *G09G 2340/0407* (2013.01); *G09G 2340/10* (2013.01); *G09G 2354/00* (2013.01); *G09G 2356/00* (2013.01); *G09G 2360/16* (2013.01)

(56) References Cited

U.S. PATENT DOCUMENTS

| | | |
|---|---|---|
| 2015/0373793 A1 | 12/2015 | Bower et al. |
| 2018/0284470 A1 | 10/2018 | Yamamoto et al. |
| 2019/0149810 A1* | 5/2019 | Kim ............ H04N 13/302 348/51 |
| 2019/0355330 A1* | 11/2019 | Lin ............ G09G 5/026 |
| 2022/0247988 A1 | 8/2022 | Lu |
| 2024/0212586 A1 | 6/2024 | Lee et al. |

FOREIGN PATENT DOCUMENTS

| | | |
|---|---|---|
| TW | I763321 | 5/2022 |
| WO | 2018004170 | 1/2018 |

OTHER PUBLICATIONS

1 "Office Action of Taiwan Related Application No. 112149776", issued on May 21, 2024, pp. 1-8.

"Office Action of Taiwan Counterpart Application", issued on Aug. 22, 2024, p. 1-p. 5.

"Office Action of U.S. Related Application, U.S. Appl. No. 18/389,778", issued on Aug. 28, 2024, p. 1-p. 15.

* cited by examiner

MULTI-LAYER DISPLAY MODULE

CROSS-REFERENCE TO RELATED APPLICATION

This application claims the priority benefit of U.S. provisional application Ser. No. 63/459,252, filed on Apr. 13, 2023. The entirety of the above-mentioned patent application is hereby incorporated by reference herein.

BACKGROUND OF THE DISCLOSURE

Field of the Disclosure

The present invention relates to a display module, and particularly to a multi-layer display module.

Description of Related Art

With the advancement of display technology, displays have evolved from traditional, thick cathode ray tubes (CRT) to thinner and lighter liquid crystal displays, and then to self-luminous organic light-emitting diodes (OLED) displays and micro light-emitting diode (micro-LED) displays. In addition, transparent displays have also been developed. When a transparent display with good display quality is developed, it can bring new experiences and applications to users, for example, it can form a multi-layer display. However, there are still some issues to be overcome and solved in the matching of display effects of each layer of the multi-layer display.

SUMMARY OF THE DISCLOSURE

The present invention provides a multi-layer display module, the display effects of each layer of which have good matching.

An embodiment of the present invention provides a multi-layer display module, which includes a first display panel, and a second display panel. Dimension of long side of the first display panel is D1, and the first display panel has first pixel resolution P1. The second display panel is located on one side of the first display panel and overlapped with the first display panel, and includes a plurality of display pixels and light-transmitting areas located between the plurality of display pixels. Each display pixel includes a plurality of micro light-emitting diodes, wherein there is a space d between the first display panel and the second display panel. Dimension of the long side of the second display panel is D2, and the second display panel has the second pixel resolution P2. Transmittance of the second display panel is T2. The multi-layer display module complies with T2>40%, P1≠P2, and $$D2*T2 \geq d \geq \frac{D2}{|P1-P2|*P2}.$$

A display screen of the first display panel forms a viewing screen with a display screen of the second display panel through the light-transmitting areas.

In the embodiment of the multi-layer display module of the present invention, the multi-layer display module complies with T2>40%, P1≠P2, and $$D2*T2 \geq d \geq \frac{D2}{|P1-P2|*P2},$$

so that the display effects of each layer have good matching and can provide sufficient depth of field effect and make the first display panel have sufficient image quality.

DESCRIPTION OF THE EMBODIMENTS

Figure 1A:
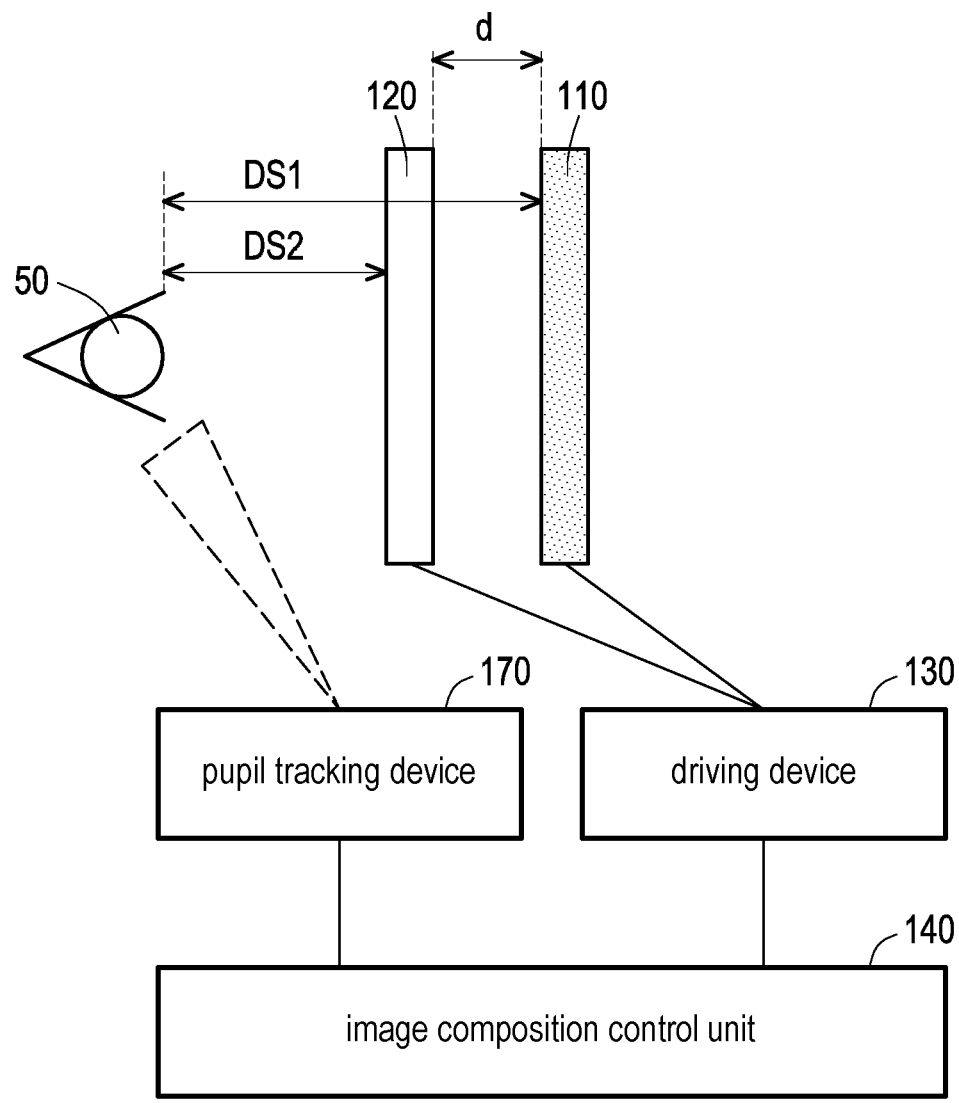
FIG. 1A is a schematic structural diagram of a multi-layer display module according to an embodiment of the present invention.
Figure 1B:
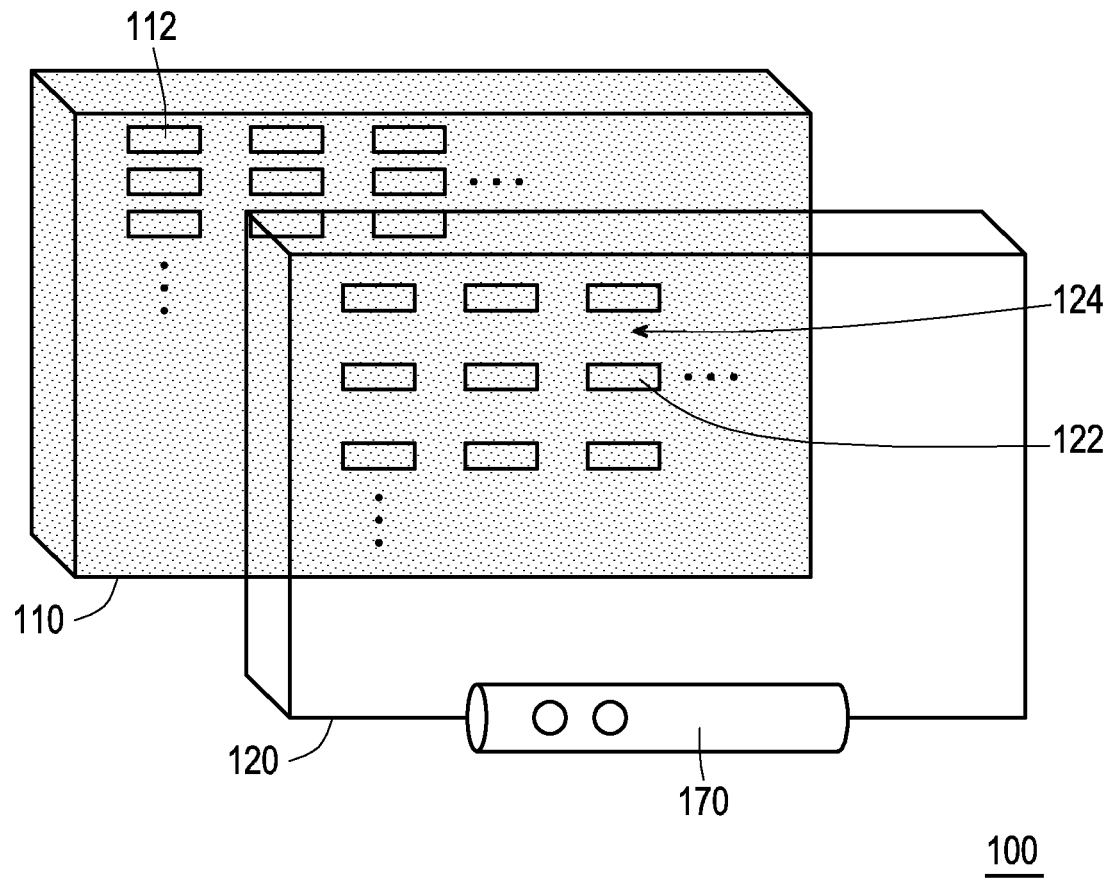
FIG. 1B is a schematic three-dimensional view of the multi-layer display module of FIG. 1A.

FIG. 1A is a schematic structural diagram of a multi-layer display module according to an embodiment of the present invention, and FIG. 1B is a schematic three-dimensional view of the multi-layer display module of FIG. 1A. Please refer to FIG. 1A and FIG. 1B. The multi-layer display module 100 of this embodiment includes a first display panel 110, a second display panel 120 and a driving device 130. The second display panel 120 is located on one side of the first display panel 110 and overlapped with the first display panel 110, and includes a plurality of display pixels 122 and light-transmitting areas 124 located between the display pixels 122.

In this embodiment, the second display panel 120 may further include circuits that are electrically connected to the display pixels 122, the circuits may include scan lines, data lines and some drive circuits, which are well known to those with ordinary knowledge in the field. In order to keep the diagram concise, the plurality of circuits are no longer drawn.

In addition, a space between the first display panel 110 and the second display panel 120 is d. A display screen of the first display panel 110 forms a viewing screen with a display screen of the second display panel 120 through the light-transmitting areas 124. The driving device 130 is configured to simultaneously provide image signals to the first display panel 110 and the second display panel 120 to display the display image of the first display panel 110 and the display image of the second display panel 120 respectively. For example, the driving device 130 is configured to simultaneously provide image signals to the first display panel 110 and the second display panel 120 to display the first image and the second image respectively, and to provide object image signals to the first display panel 110 or the second display panel 120, and display the object image. The object image displayed on the first display panel is the first object image, the object image displayed on the second display panel is the second object image. The first image forms a viewing screen with the second image and the object image through the light-transmitting areas 124. Specifically, in one embodiment, the orthographic projection of the second display panel 120 on the first display panel 110 completely overlaps the first display panel 110, thereby providing a better viewing image.

In this embodiment, the plurality of display pixels 122 include a plurality of micro light-emitting diodes. Micron-level micro light-emitting diodes as display pixels can have better luminance and higher transmittance to allow the first image to pass through. Each display pixel 122 includes at least three micro light-emitting diodes with different light colors.

For example, each display pixel 122 may include a red micro-LED, a green micro-LED, and a blue micro-LED. In addition, in this embodiment, the luminance of the first image is greater than the luminance of the second image. For example, a ratio of the luminance of the first image to the luminance of the second image falls within the range of 1.2 to 2.

In one embodiment, the first display panel 110 can emit a maximum rated luminance of L1, the second display panel 120 can emit a maximum rated luminance of L2, and L1 is greater than L2. For example, the ratio of L1 to L2 falls within the range of 1.2 to 2.

In this embodiment, the first image is a background image, and the second image is a main image. Since a space between the first display panel 110 and the second display panel 120 is d, the second image (main image) appears in front of the first image (background image), which has an effect similar to a three-dimensional display.

In some embodiments, the luminance of the main image is greater than the luminance of the background image, so that the main image can be more eye-catching to an external viewer 50 to achieve a three-dimensional visual effect of the front and rear images.

In this embodiment, the resolution of the second image is smaller than or equal to the resolution of the first image, and thus it is easier for the external viewer 50 to distinguish the first image from the second image, thereby achieving a better stereoscopic display effect.

In one embodiment, the luminance of the first image is controlled by a voltage signal, and the luminance of the second image is driven by a current signal. For example, the first display panel 110 is a liquid crystal display, which controls luminance by the voltage signal, and the second display panel 120 is a micro light-emitting diode display, whose micro light-emitting diodes can be driven by the current signal which precisely controls the presentation of main image.

In this embodiment, the transmittance of the second display panel 120 is greater than the transmittance of the first display panel 110. In this way, it is easier for the external viewer 50 to view the first image displayed by the first display panel 110 through the second display panel 120.

Figure 2A:
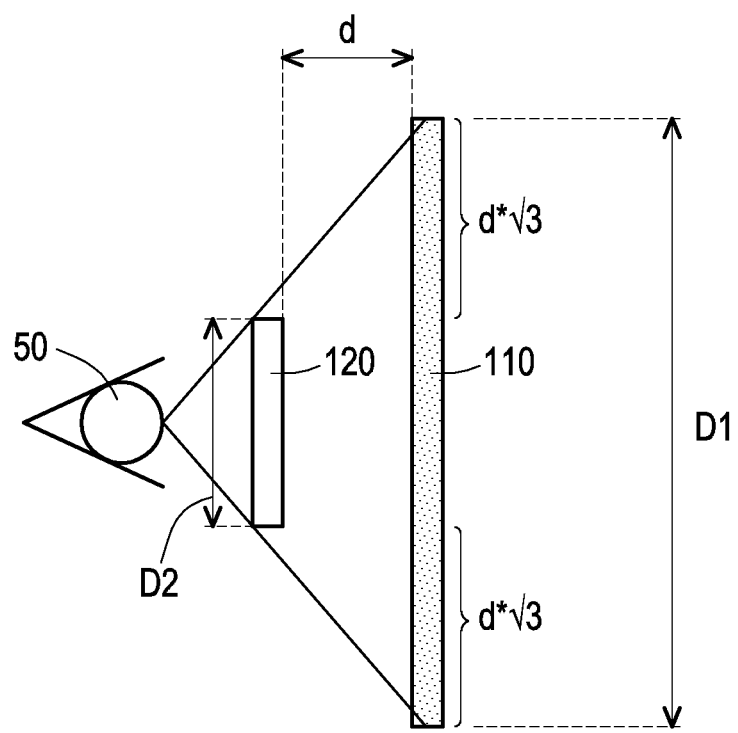
FIG. 2A is a s schematic side view of a multi-layer display module according to another embodiment of the present invention.
Figure 2B:
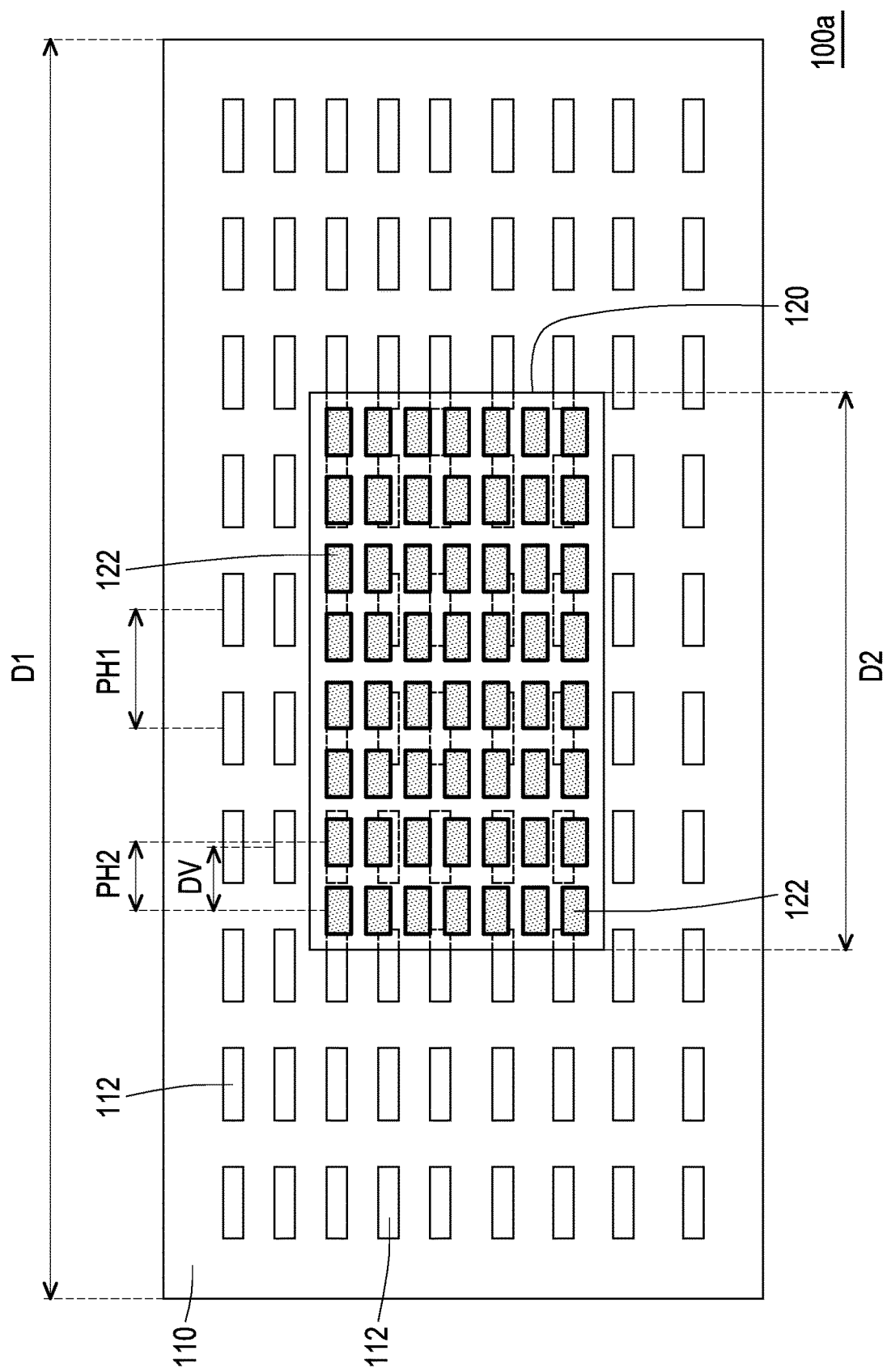
FIG. 2B is a schematic front view of the multi-layer display module of FIG. 2A.

FIG. 2A is a schematic side view of a multi-layer display module according to another embodiment of the present invention and FIG. 2B is a schematic front view of the multi-layer display module of FIG. 2A. In another embodiment, please refer to FIG. 2A and FIG. 2B, the dimension of the first display panel 110 is larger than the dimension of the second display panel 120.

For example, the dimension of the long side of the first display panel 110 is D1, the dimension of the long side of the second display panel 120 is D2, the space between the first display panel 110 and the second display panel 120 is d, and the multi-layer display module 100a complies with $D1-D2 \geq 2*\sqrt{3}*d$. In this way, the external viewer 50 can view the first image displayed by the first display panel 110 through the second display panel 120 at any angle under the 120° angle of view.

In one embodiment, D1 is the dimension of the long side of the display area of the first display panel 110, and D2 is the dimension of the long side of the display area of the second display panel 120. In this embodiment, the luminous opening angles of the display pixels 122 of the second display panel 120 are larger than the luminous opening angles of the display pixels 112 of the first display panel 110. The smaller luminous opening angles of the first display panel 110 helps the light energy to be concentrated and to penetrate effectively the second display panel 120 for observation by the external viewer 50. The smaller luminous opening angles of the first display panel 110 can reduce the large-angle ineffective light transmitting to the side wall and avoid wasting light energy.

Figure 3A:
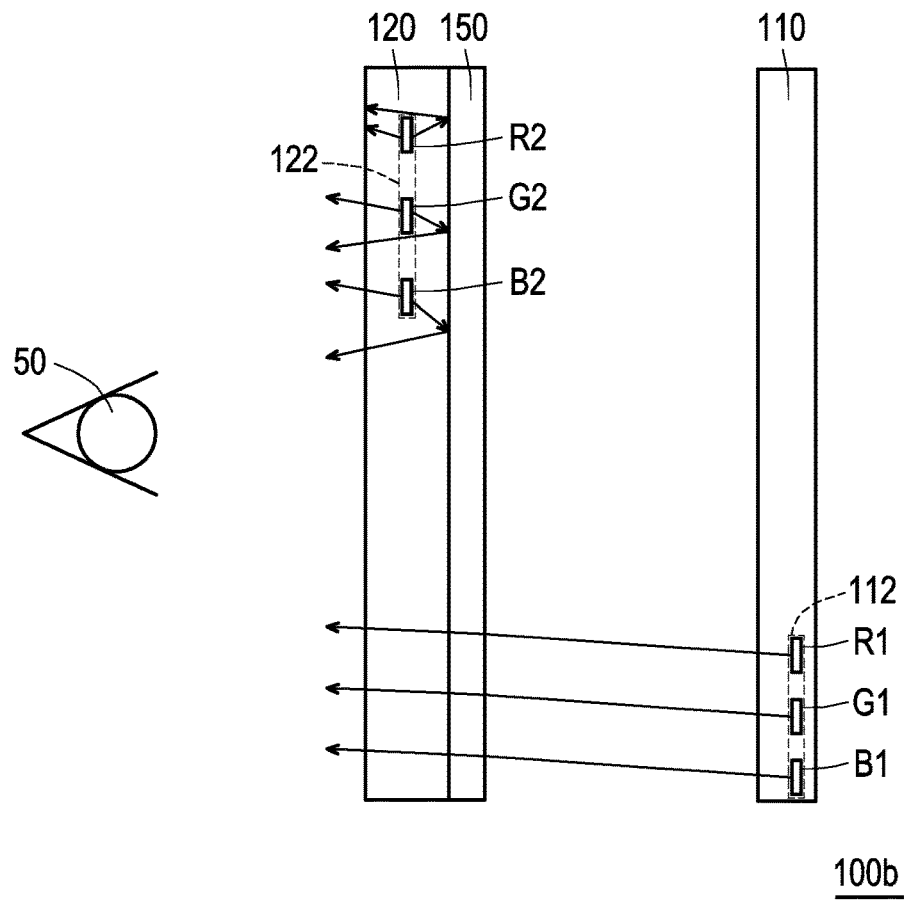
FIG. 3A is a schematic structural diagram of a multi-layer display module according to another embodiment of the present invention.
Figure 3B:
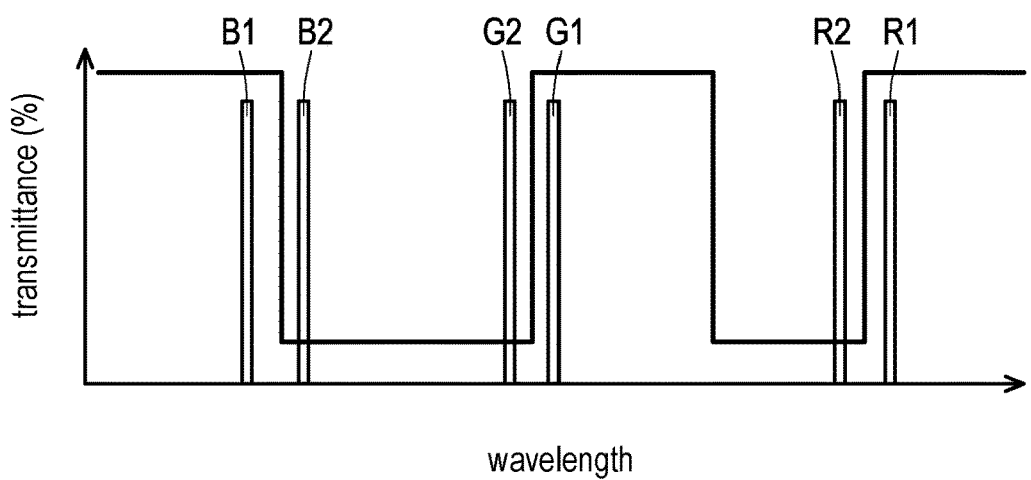
FIG. 3B is a schematic diagram of the transmission spectrum of the optical film in FIG. 3A and the peak wavelength of the light emitted by the sub-pixels of each color.

FIG. 3A is a schematic structural diagram of a multi-layer display module according to another embodiment of the present invention, and FIG. 3B is a schematic diagram of the transmission spectrum of the optical film and the peak wavelengths of light emitted by sub-pixels of various colors in FIG. 3A. In another embodiment, please refer to FIG. 3A and FIG. 3B. The multi-layer display module 100b further includes an optical film 150, which is disposed between the first display panel 110 and the second display panel 120. The optical film 150 has high reflectivity for light emitted by the second display panel 120. For example, the reflectivity is greater than or equal to 90%. In addition, in this embodiment, the optical film 150 has high transmittance for light emitted by the first display panel 110, and the transmittance is, for example, greater than or equal to 90%.

Specifically, in this embodiment, the plurality of display pixels 112 of the first display panel 110 have a plurality of first sub-pixels, and the plurality of display pixels 122 of the second display panel 120 have a plurality of second sub-pixels, a peak wavelength of the same color light emitted by the first sub-pixel and a peak wavelength of the same color light emitted by the second sub-pixel are different. High transmittance of wavelength range of the optical film 150 corresponds to each wavelength of the plurality of first sub-pixels of the first display panel 110, and high reflectivity of wavelength range of the optical film 150 corresponds to each wavelength of the plurality of the second sub-pixels of the second display panel 120.

In this embodiment, each display pixel 122 of the second display panel 120 may include a red sub-pixel R2, a green sub-pixel G2 and a blue sub-pixel B2 (the plurality of sub-pixels are second sub-pixels). Each display pixel 112 of the first display panel 110 may include a red sub-pixel R1, a green sub-pixel G1, and a blue sub-pixel B1 (the plurality of sub-pixels are first sub-pixels).

In one embodiment, the peak wavelength of the red sub-pixel R1 is, for example, 630 nm. The peak wavelength of the red sub-pixel R2 is, for example, 610 nm. The peak wavelength of the green sub-pixel G1 is, for example, 540 nm. The peak wavelength of the green sub-pixel G2 is, for example, 520 nm. The peak wavelength of the blue sub-pixel B1 is, for example, 440 nm. The peak wavelength of the blue sub-pixel B2 is, for example, 460 nm. As shown in FIG. 3B, the optical film 150 has high transmittance, that is, low reflectivity, for light emitted by the red sub-pixel R1, the green sub-pixel G1 and the blue sub-pixel B1 of the first display panel 110, and the optical film 150 has low transmittance, that is, high reflectivity for light emitted by the red sub-pixel R2, the green sub-pixel G2 and the blue sub-pixel B2 of the second display panel 120.

Figure 4:
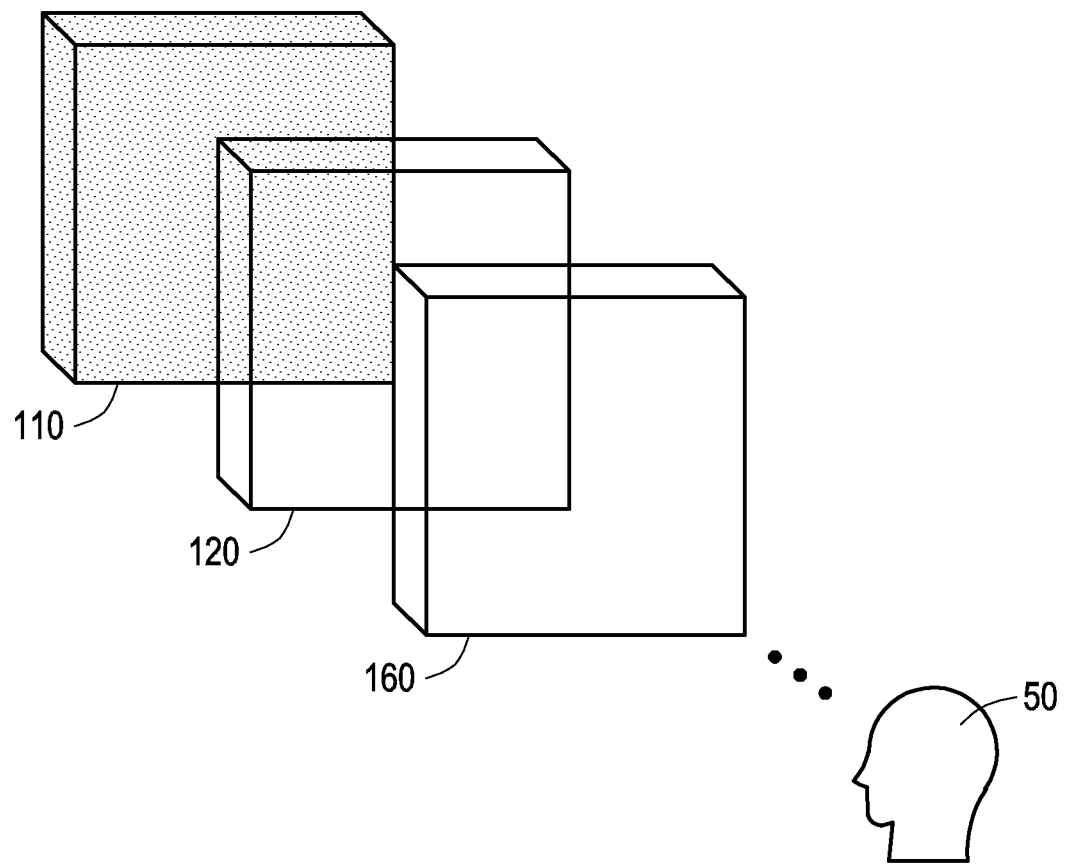
FIG. 4 is a schematic three-dimensional view of a multi-layer display module according to another embodiment of the present invention.

FIG. 4 is a schematic three-dimensional view of a multi-layer display module according to another embodiment of the present invention. In another embodiment, please refer to FIG. 4, the multi-layer display module 100c includes a third display panel 160 located on a side of the second display panel 120 away from the first display panel 110. In this embodiment, the first display panel 110, the second display panel 120, and the third display panel 160 are arranged in sequence with gaps between them toward the eyes of the external viewer 50.

In this embodiment, the transmittance of the third display panel 160 is greater than the transmittance of the second display panel 120, and the luminance of the second display panel 120 is greater than the luminance of the third display panel 160. In one embodiment, the transmittance of the third display panel is greater than 50%. The present invention does not limit the number of display panels to two or three. In other embodiments, there can also be more than four display panels arranged in sequence with gaps between them toward the eyes of the external viewer 50. The closer the display panel to the external viewer 50 is, the greater the transmittance of the display panel is, so as to have a better display effect.

Please refer to FIG. 1A and FIG. 1B again. In this embodiment, the multi-layer display module 100 further includes an image composition control unit 140. The image composition control unit 140 is configured to calculate the first distance DS1 from an external viewer 50 to the first display panel 110 and second distance DS2 from the external viewer 50 to the second display panel 120 respectively based on relative position information of the external viewer 50. Increasing (for example, increasing proportionally) a dimension of the first object image displayed on the first display panel 110 or reducing (for example, reducing proportionally) a dimension of the second object image displayed on the second display panel 120 make the external viewer 50 have the same viewing angle for the first object image and the second object image according to the first distance DS1 and the second distance DS2.

Figure 5A:
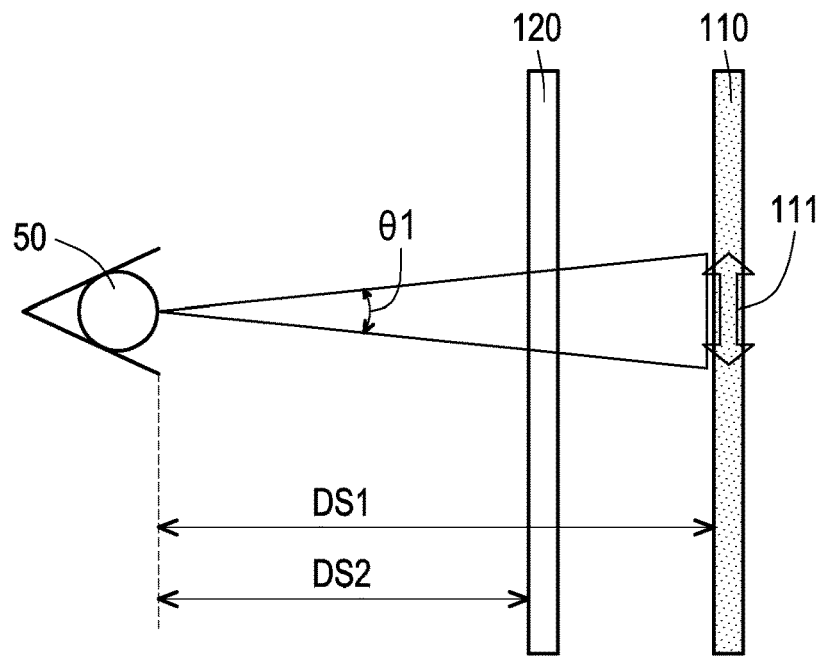
FIGS. 5A and 5B are schematic cross-sectional views of a first display panel displaying a first object image and a second display panel displaying a second object image in a comparative embodiment.
Figure 5B:
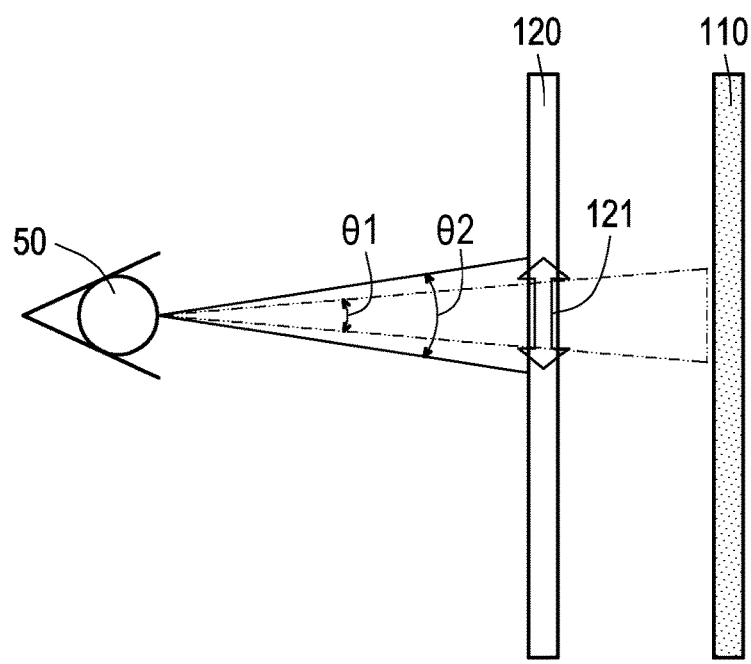

For example, as shown in FIG. 5A, if a first object image 111 is originally displayed on the first display panel 110, the dimension of first object image 111 generates a viewing angle θ1 for the eyes of the external viewer 50. When the multi-layer display module creates the effect that the object image is closer to the external viewer 50, the object image can be switched from the first display panel 110 to the second display panel 120, that is, the second display panel 120 is configured to display the second object image 121 the same as the first object image 111, as shown in FIG. 5B.

However, since the dimension of the first object image 111 is the same as the dimension of the second object image 121 and the second object image 121 is closer to the eyes of the external viewer 50, the second object image 121 will give a larger angle view angle θ2 to the eyes of the external viewer 50 (where θ2>θ1). As a result, when the object image switches from the first display panel 110 to the second display panel 120, the external viewer 50 suddenly feel the object image becoming larger, and the dynamic display effect of the multi-layer display module unnatural.

Figure 6:
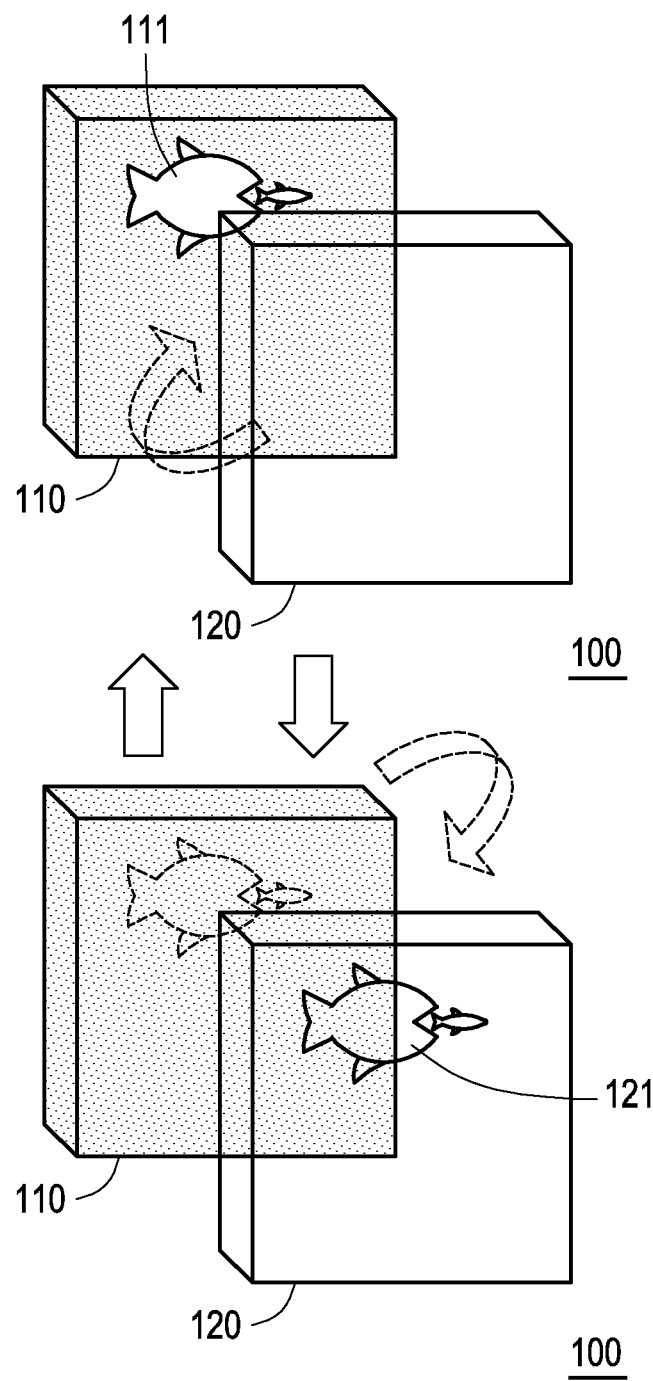
FIG. 6 is a three-dimensional schematic diagram of the multi-layer display module in FIG. 1A switching between the first display panel displaying the first object image and the second display panel displaying the second object image.

Therefore, in this embodiment, as shown in FIG. 6, in case 1, the first object image 111 can be displayed on the first display panel 110, and then the image composition control unit 140 can reduce the dimension of the second object image 121 displayed on the second display panel 120 based on the position of the external viewer 50 (such as the above-mentioned first distance DS1 and second distance DS2) to obtain the same viewing angle as the first object image 111 when a state of the first object image 111 displayed on the first display panel 110 is switched to a state of the second object image 121 displayed on the second display panel 120.

The first object image 111 and the second object image 121 are corresponding images. In this way, when the object image switches from the first display panel 110 to the second display panel 120, the external viewer 50 will not suddenly feel that the object image becoming larger. Instead, the external viewer 50 will feel that the multi-layer display module 100 of this embodiment has natural dynamic display effect.

In addition, in case 2, the second object image 121 can also be displayed on the second display panel 120, and then the image composition control unit 140 can increase the dimension of the first object image 111 displayed on the first display panel 110 based on the position of the external viewer 50 (such as the above-mentioned first distance DS1 and second distance DS2) to obtain the same viewing angle as the second object image 121 when a state of the second object image 121 displayed on the second display panel 120 is switched to a state of the first object image 111 displayed on the first display panel 110.

In this way, when the object image switches from the second display panel 120 to the first display panel 110, the external viewer 50 will not suddenly feel that the object image becoming smaller. Instead, the external viewer 50 will feel that the multi-layer display module 100 of this embodiment has natural dynamic display effect.

In one embodiment, the image composition control unit 140 gradually changes the dimension of the first object image 111 displayed on the first display panel 110 or the dimension of the second object image 121 displayed on the second display panel 120 respectively so that the external viewer 50 has the same viewing angle for the first object image 111 and the second object image 121.

In another embodiment, in case 1, after switching the state of the first object image 111 displayed on the first display panel 110 to the state of the second object image 121 displayed on the second display panel 120, the image composition control unit 140 can increase gradually the dimension of the second object image 121 displayed on the second display panel 120, giving the external viewer 50 a gradually increasing viewing angle for the second object image 121 and an visual effect that the second object image 121 is getting closer and closer to the external viewer 50.

In addition, in another embodiment, in case 2, after switching the state of the second object image 121 displayed on the second display panel 120 to the state of the first object image 111 displayed on the first display panel 110, the image composition control unit 140 can reduce gradually the dimension of the first object image 111 displayed on the first display panel 110, giving the external viewer 50 a gradually reducing viewing angle for the first object image 111 and an visual effect that the first object image 111 is getting farther and farther away from the external viewer 50.

In another embodiment, in case 1, before switching the state of the first object image 111 displayed on the first display panel 110 to the state of the second object image 121 displayed on the second display panel 120, the image composition control unit 140 can increase gradually the dimension of the first object image 111 displayed on the first display panel 110, giving the external viewer 50 a gradually increasing viewing angle for the first object image 111 and an visual effect that the first object image 111 is getting closer and closer to the external viewer 50.

In another embodiment, in case 2, before switching the state of the second object image 121 displayed on the second display panel 120 to the state of the first object image 111 displayed on the first display panel 110, the image composition control unit 140 can reduce gradually the dimension of the second object image 121 displayed on the second display panel 120, giving the external viewer 50 a gradually reducing viewing angle for the second object image 121 and an visual effect that the second object image 121 is getting farther and farther away from the external viewer 50.

In another embodiment, in case 1, before switching the state of the first object image 111 displayed on the first display panel 110 to the state of the second object image 121 displayed on the second display panel 120, the image composition control unit 140 can increase gradually the dimension of the first object image 111 displayed on the first display panel 110, and in case 1, after switching the state of the first object image 111 displayed on the first display panel 110 to the state of the second object image 121 displayed on the second display panel 120, the image composition control unit 140 can increase gradually the dimension of the second object image 121 displayed on the second display panel 120, giving the external viewer 50 a continuously and gradually increasing viewing angle for the first object image 111 and the second object image 121 and an visual effect that the object image is getting closer and closer to the external viewer 50.

In another embodiment, in case 2, before switching the state of the second object image 121 displayed on the second display panel 120 to the state of the first object image 111 displayed on the first display panel 110, the image composition control unit 140 can reduce gradually the dimension of the second object image 121 displayed on the second display panel 120, and in case 2, after switching the state of the second object image 121 displayed on the second display panel 120 to the state of the first object image 111 displayed on the first display panel 110, the image composition control unit 140 can reduce gradually the dimension of the first object image 111 displayed on the first display panel 110, giving the external viewer 50 a gradually reducing viewing angle for the first object image 111 and the second object image 121 and an visual effect that the object image is getting farther and farther away from the external viewer 50.

As described in the above embodiments, the multi-layer display module 100 can provide natural dynamic display effects.

In this embodiment, the multi-layer display module 100 further includes a pupil tracking device 170 is configured to measure the relative position information between the external viewer 50 and the multi-layer display module 100 and provide the relative position information to the image composition control unit 140.

The pupil tracking device 170 may include a camera, an image sensor, a distance sensor, or any suitable position sensor. In the multi-layer display modules 100d, 100e and 100f of FIGS. 7A, 7B and 7C, the pupil tracking device includes sensing elements 172 embedded between the plurality of the display pixels 112 in the first display panel 110 and sensing elements 174, 174a, or 174b embedded between the plurality of the display pixels 122 in the second display panel 120.

Figure 7A:
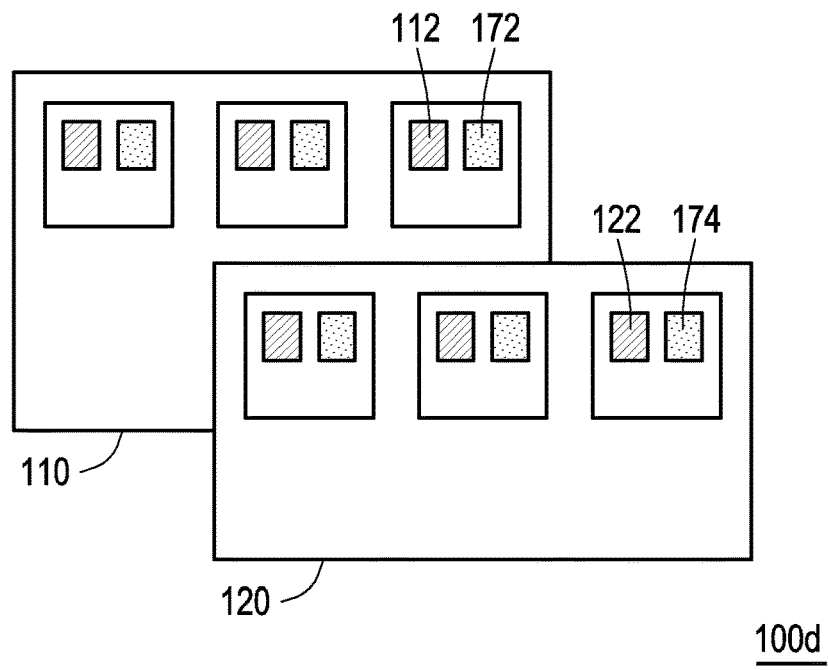
FIGS. 7A, 7B and 7C are schematic diagrams of multi-layer display modules and sensing elements therein according to other three embodiments of the present invention.

For example, in FIG. 7A of the multi-layer display module 100d, the sensing elements 172 and the sensing elements 174 are disposed on the first display panel 110 and the second display panel 120, respectively. The sensing elements 172 and the display pixels 112 are arranged alternatively, and the sensing elements 174 and the display pixels 122 are arranged alternatively.

Figure 7B:
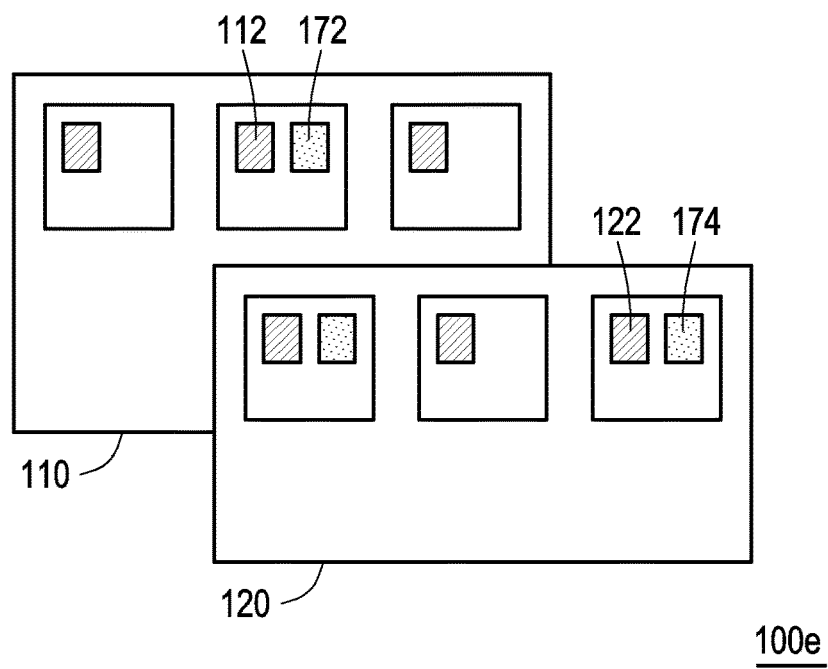

In FIG. 7B of the multi-layer display module 100e, the sensing element 172 may appear once at least every two display pixels 112, and the sensing element 174 may appear once every at least two display pixels 122.

Figure 7C:
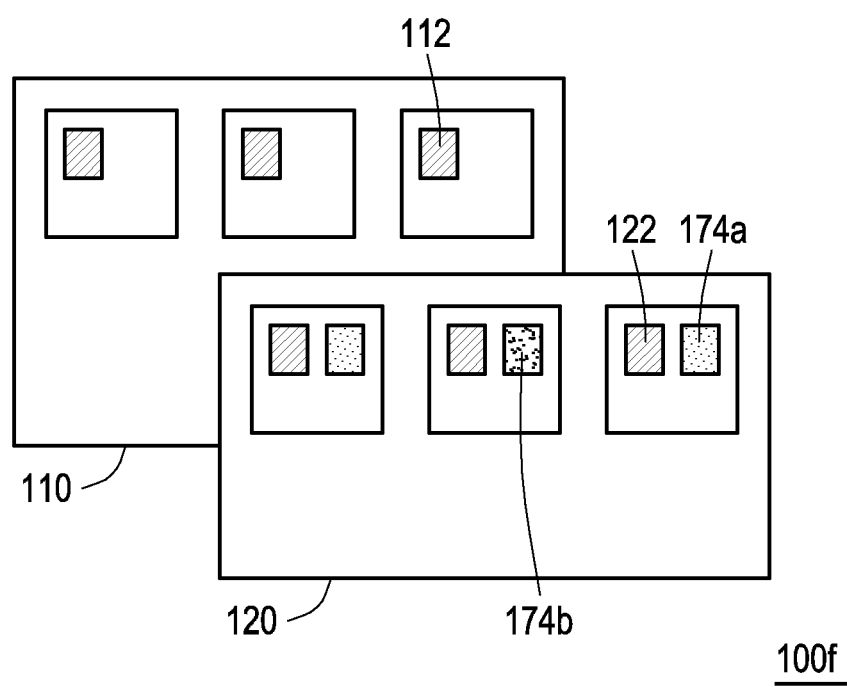

In FIG. 7C of the multi-layer display module 100f, the sensing elements can be divided into two groups, which are respectively composed of sensing elements 174a and 174b. These two groups can sense different eyeballs respectively. The sensing elements 172, 174, 174a or 174b are, for example, sensing pixels, which may include photodiodes.

Please refer to FIG. 1A and FIG. 1B. In this embodiment, the driving device 130 includes an image database. Image data in the image database has the first frame and the second frame listed in the same time sequence. the driving device 130 converts the first frame and the second frame into the image signals after decoding and after the first display panel 110 and the second display panel 120 are provided, the first display panel 110 and the second display panel 120 are played synchronously based on timing sequence information included after providing the image signals to the first display panel and the second display panel.

In one embodiment, the transmittance of the second display panel 120 is T2, the luminance of the first display panel 110 is L1, the luminance of the second display panel 120 is L2, and the multi-layer display module 100 complies with T2>40% and $$0.8 \le \frac{L1}{L2*(1-T2)},$$

so as to ensure that the external viewer 50 can have basically sufficient recognition luminance. when viewing the image of the first display panel 110.

In some embodiments, the first display panel 110 emits a maximum rated luminance of L1, and the second display panel 120 emits a maximum rated luminance of L2.

In one embodiment, the plurality of display pixels 122 include a plurality of micro light-emitting diodes, the luminance of the first display panel 110 is L1, the luminance of the second display panel 120 is L2, the transmittance of the second display panel 120 is T2, and the multi-layer display module 100 complies with $$0.8 \le \frac{L1}{L2*(1-T2)} \le 1.2.$$

When $$\frac{L1}{L2*(1-T2)}$$

is greater than or equal to 0.8, the external viewer 50 will have basically enough recognition luminance to watch the image of the first display panel 110. When $$\frac{L1}{L2*(1-T2)}$$

is less than or equal to 1.2, it can avoid over-correction, causing the first display panel 110 wasting unnecessary energy.

In one embodiment, the plurality of display pixels 122 include a plurality of micro light-emitting diodes, the luminance of the first display panel 110 is L1, the luminance of the second display panel 120 is L2, the transmittance of the second display panel 120 is T2, and the multi-layer display module Group 100 complies with $$0.8 \le \frac{L1*T2}{L2} \le 1.2.$$

Such a design allows the external viewer 50 to view the images of the first display panel 110 and the second display panel 120 with relatively consistent image luminance.

In some embodiments, the first display panel 110 emits a maximum rated luminance of L1, and the second display panel 120 emits a maximum rated luminance of L2.

Please refer to FIG. 2A and FIG. 2B, in the multi-layer display module 100a, the dimension of the long side of the first display panel 110 is D1, and the first display panel 110 has the first pixel resolution P1. The dimension of the long side of the second display panel 120 is D2, and the second display panel 120 has the second pixel resolution P2. The space between the first display panel 110 and the second display panel 120 is d, and the transmittance of the second display panel 120 is T2. The multi-layer display module 100a complies with T2>40%, P1≠P2 and $$D2*T2 \ge d \ge \frac{D2}{|P1-P2|*P2}.$$

The second display panel 120 has a transmittance of T2 less than 100%, which will partially block light emitted from the first display panel 110 and cause the image quality of the first display panel 110 to degrade (image quality includes image luminance, sharpness, color saturation, etc.).

In order to maintain sufficient image quality of the first display panel 110, d cannot be too large, that is, the optical path from light emitted by the first display panel 110 to the second display panel 120 should be limited, so that light emitted by the first display panel 110 can transmit toward the external viewer 50 and pass through the second display panel 120 as early as possible, thereby reducing the light staying in the divergent propagation process and avoiding excessive deterioration in image quality instead of passing through the second display panel 120 with too much divergent propagation which results in deterioration in image quality. Therefore, the lower T2 is, the smaller d is and the better image quality is. For example, when T2=60%, d can be set as 27 cm, and when T2=40%, d can be set as 18 cm.

In addition, whether the viewing effect of reduced image quality of the first display panel 110 will affect the subjective perception of the viewer compared with the native viewing effect (difference of image quality) of the second display panel 120 depends on the viewing distance. When the viewing distance is further away, the difference in subjective perception between the first display panel 110 and the second display panel 120 will become smaller (the difference will be evened out).

In this case, a relatively large space d will be allowed. The farther the viewing distance is, the more the viewing distance has a positive correlation with the dimension of the second display panel 120. When the second display panel 120 is becoming larger, the viewing distance should be correspondingly farther to obtain a more comfortable viewing effect.

On the contrary, the smaller the second display panel 120 is, the viewing distance should be corresponding. to get closer for more comfortable viewing. In other words, the dimension of the second display panel 120 is positively related to the viewing distance, and the viewing distance is positively related to the acceptable image quality difference.

That is, the dimension of the second display panel 120 is positively related to the acceptable image quality difference. At the same time, as mentioned above, the transmission T2 is positively related to the acceptable image quality difference. (The smaller the dimension of the second display panel 120 is, the closer you need to view the second display panel 120. The easier the difference in image quality is to be noticed, the narrower the space d is to reduce the difference in image quality).

Both the dimension of the second display panel 120 and T2 will limit the dimension of the space d. It is necessary to ensure that the space d should not be too large and to prevent the degradation extent of the image quality of the first display panel 110 (the difference in subjective perception between the first display panel 110 and the second display panel 120) from being too significant.

Therefore, the product of D2 and T2 is taken as the upper limit of the space d, where unit of measurement for D2 and the space d is centimeter (cm). Therefore, it is a better situation that the multi-layer display module 100a complies with D2*T2≥d. For example, in one embodiment, T2=60%, D2=50 cm, then d=27 cm (less than 30 cm).

On the other hand, the pixel resolution (unit, for example, pixels per inch, PPI) of the first display panel 110 and the second display panel 120 may be different. The pixel resolution P1 of the first display panel 110 is, for example, 50 PPI~500 PPI. The pixel resolution P2 of the second display panel 120 is, for example, 50 PPI~500 PPI. When the difference between P1 and P2 is becoming larger (the absolute value of P1 minus P2), the human eye will detect the difference of relative position between the first display panel 110 and the second display panel 120 through image displayed on the first display panel 110 and image displayed on the second display panel 120, and the human eye will feel different distance between the first display panel 110 and the second display panel 120. In the dimension of the arrangement direction of the first display panel 110 and the second display panel 120, a three-dimensional visual experience is achieved due to the difference of relative position between the first display panel 110 and the second display panel. 120. At least one of P1 and P2 does not reach retinal resolution. When the pixel resolution P1 of the first display panel 110 and the pixel resolution P2 of the second display panel 120 both reach retinal resolution, it is difficult for the human eye to detect the difference of relative position between the first display panel 110 and the second display panel 120.

The pixel resolution P2 of the second display panel 120 is greater than or equal to the pixel resolution P1 of the first display panel 110. The larger the pixel resolution P2 is, the denser the number of micro light-emitting diodes per inch in the second display panel 120 is and the better image quality the second display panel 120 can provide, and the closer the viewer can watch at this time.

When the first distance DS1 and the second distance DS2 are both reduced, effect of depth of field can be achieved with a smaller space d (the comparison benchmark is smaller, and the difference in d will be more significant). Therefore, P2 and the space d are approximately inversely proportional to each other.

In other words, the configuration of the space d must be based on the initial image quality of the first display panel 110 because the image quality of the first display panel 110 will be further degraded after the light emitted from the first display panel 110 passes through the second display panel 120. The dimension of the second display panel 120 will affect the viewing distance. Once the viewing distance increases, the first distance DS1 and the second distance DS2 (as shown in FIG. 1A) will increase at the same time.

In order to maintain the three-dimensional viewing effect (maintain the effect of depth of field between these two), the corresponding space d must also be increased accordingly, which will change the lower limit set by the spacing d. Therefore, the dimension D2 of the second display panel 120 is approximately proportional to the space d. In one embodiment, P1 is, for example, 200 PPI, and P2 is, for example, 100 PPI. Due to the different resolutions, the images perceived by the human eye will not be confused, and the distance difference between the first display panel 110 and the second display panel 120 can be clearly distinguished.

When |P1−P2| is becoming smaller, the image display details between the first display panel 110 and the second display panel 120 are becoming more similar, and it is less easy for the human eye to detect the difference between these two. Especially, it is relatively necessary to increase the space d to ensure that the first display panel 110 and the second display panel 120 have different visual depths for viewers to maintain a three-dimensional visual experience when both of these two display panels look very clear. Therefore, |P1−P2| is approximately inversely proportional to d. On the contrary, the larger |P1−P2| is, the smaller d is allowed to achieve a three-dimensional visual experience. For example, P1 is 314 PPI and P2 is 114 PPI. Based on the above, it is a better situation that the multi-layer display module 100*a* complies with $$d \geq \frac{D2}{|P1-P2|*P2}.$$

In the multi-layer display module 100*a* of this embodiment, the multi-layer display module 100*a* complies with T2>40%, P1≠P2 and $$D2*T2 \geq d \geq \frac{D2}{|P1-P2|*P2},$$

so that the display effects of each layer have good matching and can provide sufficient depth of field. effect, and make the first display panel 110 have sufficient image quality.

Please refer to FIG. 2A and FIG. 2B. In this embodiment, P1 is not an integer multiple of P2, or P2 is not an integer multiple of P1. A pitch of the display pixels 112 of the first display panel 110 is PH1, and A pitch of the display pixels 122 of the second display panel 120 is PH2. There is a non-integer multiple relationship between PH1 and PH2.

In addition, in this embodiment, in the overlapping portion of the display area of the first display panel 110 and the second display panel 120, a center position of the plurality of the display pixel 122 at the edge of the second display panel 120 relative to a center position of the plurality of the display pixel 112 of the first display panel 110 at periphery of the overlapping portion has a shift amount DV, and the shift amount DV is greater than or equal to half of the pitch PH2 of the display pixels 122 of the second display panel 120. That is, the center of the display pixels 112 and the center of the display pixels 122 are arranged alternatively with each other, which can reduce the light emitted from the first display panel 110 being blocked by the display pixels 122 of the second display panel 120, thereby increasing the proportion of light emitted from the first display panel 110 passing through the second display panel 120.

In addition, the shift amount DV must have sufficient distance, preferably greater than or equal to half of the spatial period of the display pixels 122 of the second display panel 120, so that the orthographic projection of the display pixels 122 of the second display panel 120 are located between two adjacent display pixels 112 of the first display panel 110.

In one embodiment, the image composition control unit 140 is, for example, a central processing unit (CPU), a microprocessor (microprocessor), a digital signal processor (DSP), a programmable controller, or a programmable controller. The present invention is not limited to programmable logic devices (PLD) or other similar devices or combinations of the plurality of devices.

In addition, in one embodiment, each function of the image composition control unit 140 may be implemented as a plurality of program codes. The plurality of program codes will be stored in a memory, and the image composition control unit 140 will execute the plurality of program codes. Alternatively, in one embodiment, each function of the image composition control unit 140 may be implemented as one or more circuits. The present invention is not limited to using software or hardware to implement each function of the image composition control unit 140.

To sum up, in the embodiment of the multi-layer display module according of the present invention, the multi-layer display module complies with T2>40% and $$D2*T2 \geq d \geq \frac{D2}{|P1-P2|*P2},$$

so that the display effects of each layer have good matching and can provide sufficient depth of field effect and make the first display panel have sufficient image quality.

What is claimed is:

1. A multi-layer display module comprising:
   a first display panel wherein a dimension of long side of the first display panel is D1, and the first display panel has a first pixel resolution P1; and
   a second display panel, located on one side of the first display panel and overlapped with the first display panel, wherein the second display panel comprises a plurality of display pixels and light-transmitting areas located between the plurality of display pixels, each of the plurality of the display pixels comprises a plurality of micro light-emitting diodes, there is a space d between the first display panel and the second display panel, a dimension of a long side of the second display panel is D2, the second display panel has a second pixel resolution P2, a transmittance of the second display panel is T2, and the multi-layer display module complies with T2>40%, P1≠P2, P2≠0, D2≠0, and D2×T2≥d≥D2/(|P2−P1|×P2).

2. The multi-layer display module according to claim 1, wherein P1 is not an integer multiple of P2, or P2 is not an integer multiple of P1.

3. The multi-layer display module according to claim 1, wherein in an overlapping portion of display area of the first display panel and the second display panel, a center position of the plurality of display pixels at an edge of the second display panel relative to a center position of a plurality of the display pixels of the first display panel at a periphery of the overlapping portion has a shift amount, and the shift amount is greater than or equal to half of a pitch of the plurality of the display pixels of the second display panel.

4. The multi-layer display module according to claim 1, wherein a luminance of the first display panel is L1, a luminance of the second display panel is L2, and the multi-layer display module complies with $$0.8 \leq \frac{L1}{L2*(1-T2)} \leq 1.2.$$

5. The multi-layer display module according to claim 1, wherein a luminance of the first display panel is L1, a luminance of the second display panel is L2, and the multi-layer display module complies with $$0.8 \leq \frac{L1*T2}{L2} \leq 1.2.$$

6. The multi-layer display module according to claim 1, wherein the first display panel emits a maximum rated luminance of L1, the second display panel emits a maximum rated luminance of L2, and L1 is greater than L2.

7. The multi-layer display module according to claim 6, wherein the pixel resolution of the second display panel is greater than or equal to the pixel resolution of the first display panel.

8. The multi-layer display module according to claim 6, wherein a luminance of the first image is controlled by a voltage signal, and a luminance of the second image is driven by a current signal.

9. The multi-layer display module according to claim 1, wherein the multi-layer display module complies with D1−D2≥*2√3*d.

10. The multi-layer display module according to claim 1, wherein luminous opening angles of the plurality of the display pixels of the second display panel are greater than luminous opening angles of a plurality of the display pixels of the first display panel.

11. The multi-layer display module according to claim 1, further comprising an optical film disposed between the first display panel and the second display panel, wherein the optical film has a reflectivity greater than or equal to 90% for light emitted by the second display panel, or the optical film has transmittance greater than or equal to 90% for light emitted by the first display panel.

12. The multi-layer display module according to claim 1 further comprising a third display panel located on one side of the second display panel away from the first display panel, wherein a transmittance of the third display panel is greater than the transmittance of the second display panel, and a luminance of the second display panel is greater than a luminance of the third display panel.

13. The multi-layer display module according to claim 1 further comprising a driving device configured to simultaneously provide image signals to the first display panel and the second display panel to a first image and a second image respectively, wherein the driving device provides object image signals to the first display panel or the second display panel, and displays an object image, wherein the object image displayed on the first display panel is a first object image, the object image displayed on the second display panel is a second object image, and the first image forms a viewing screen with the second image and the object image through the light-transmitting areas.

* * * * *